(12) United States Patent
Yekutiely

(10) Patent No.: US 8,293,117 B2
(45) Date of Patent: Oct. 23, 2012

(54) WATER QUALITY CONTROL IN COVERED RESERVOIR

(75) Inventor: Barak Yekutiely, Kochav Yair (IL)

(73) Assignee: Aquate Group Ltd., Rosh Haayin (IL)

( * ) Notice: Subject to any disclaimer, the term of this patent is extended or adjusted under 35 U.S.C. 154(b) by 384 days.

(21) Appl. No.: 12/548,482

(22) Filed: Aug. 27, 2009

(65) Prior Publication Data
US 2011/0049059 A1    Mar. 3, 2011

(51) Int. Cl.
*C02F 1/00* (2006.01)
(52) U.S. Cl. .................................... 210/747.1; 210/739
(58) Field of Classification Search ............. 210/170.05, 210/170.09, 739, 747.1
See application file for complete search history.

(56) References Cited

U.S. PATENT DOCUMENTS

| | | | |
|---|---|---|---|
| 2004/0074829 A1* | 4/2004 | Kim | 210/143 |
| 2005/0210963 A1* | 9/2005 | Yekutiely et al. | 73/53.01 |
| 2007/0283999 A1* | 12/2007 | Yekutiely et al. | 136/259 |

* cited by examiner

*Primary Examiner* — Duane Smith
*Assistant Examiner* — Paul J Durand
(74) *Attorney, Agent, or Firm* — Dekel Patent Ltd; David Klein

(57) ABSTRACT

A system for controlling water quality of a reservoir including one or more covers that at least partially cover a reservoir, one or more water quality sensors that sense physical, chemical, and biological water quality characteristics of water in the reservoir, a mixer for circulating/mixing water layers of the reservoir, and a controller in communication with the water quality sensors that processes input from the sensors to circulate/mix water layers of the reservoir that are exposed to an uncovered surface of the reservoir so as to control water quality characteristics of water in the reservoir.

2 Claims, 1 Drawing Sheet

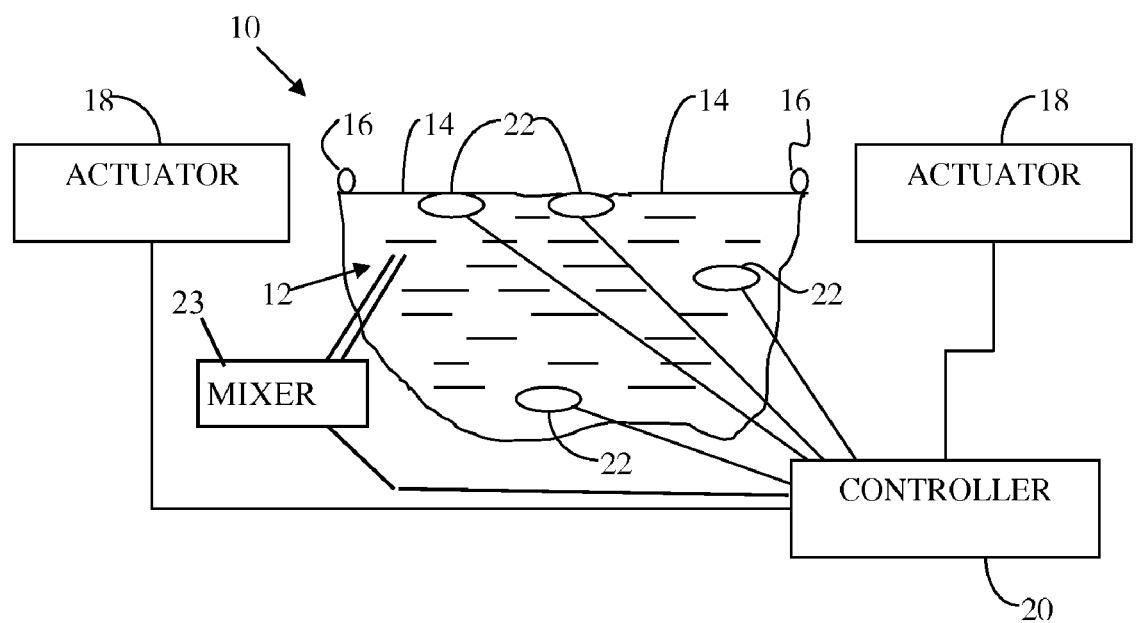

WATER QUALITY CONTROL IN COVERED RESERVOIR

FIELD OF THE INVENTION

The present invention relates generally to controlling water quality, and particularly to controlling water quality of an at least partially covered body of water.

BACKGROUND OF THE INVENTION

The quality of water in reservoirs is of great importance to society. Many publications have been written that deal with water quality of reservoirs, such as the US Army Corps of Engineers Engineer Manual 1110-2-1201, entitled "Reservoir Water Quality Analysis", from which background information herein has been taken.

"Water quality", as defined herein, includes the physical, chemical, and biological characteristics of water and the abiotic and biotic interrelationships.

Any reservoir or stream system is coupled with its watershed or drainage basin. Therefore, basin geometry, geology, climate, location, and land use are integral factors that directly or indirectly influence stream or reservoir water quality. Conversely, water quality changes in reservoirs are the result of physical, chemical, and biological loading, generally through runoff and/or stream transport and processing.

The term "reservoir" encompasses herein any natural or artificial body of water encircled by land, such as but not limited to, natural or artificial lakes, ponds, pools and the like. It is noted that there are many differences between natural and artificial lakes. For example, the deepest portion of a natural lake may be located anywhere, but is often near the center, with all portions of the lake bottom sloping toward that maximum depth. By contrast, the deepest portions of artificial reservoirs are almost always near the dam, and the reservoir bottom usually slopes toward the dam. Also, the inlet and outlet of natural lakes are near the surface, whereas an artificial reservoir can release water from any location, ranging from the surface to the deepest portion of the impoundment. Consequently, although the limnological (study of freshwater bodies) processes determining water quality conditions are the same in both cases, the hydrodynamics of artificial reservoirs make their water quality characteristics different than those of natural lakes. From an ecological point of view, an artificial reservoir normally has variable productivity potential levels - high in the early years, low during the following years and then, sometimes, high again during the reservoir's mature stage. By contrast, the natural lake follows a successional pattern from oligotrophy to eutrophy (see below "Trophic Status").

Reservoirs, especially natural lakes, have been classified using a variety of systems, including physical, chemical, and geomorphological characteristics, and indicator species or species aggregates. Examples:

a. Stratified Versus Unstratified

Reservoirs may or may not stratify, depending on conditions such as depth, wind mixing, and retention time. Under appropriate conditions, the reservoir will form an epilimnion or upper layer, a metalimnion or transitional layer, and a hypolimnion or lower layer. However, if conditions do not allow stratification, the entire reservoir may consist of an epilimnion with an isothermal gradient. The stratified or unstratified condition can dramatically affect water quality conditions of the reservoir and its releases. Releases from an unstratified reservoir, irrespective of the withdrawal level, will generally be warmwater releases; bottom-level withdrawals from a stratified reservoir will be generally coldwater releases. Warm and cold releases are relative to the water temperature of the stream into which the releases are made.

b. Operational Characteristics

Reservoir projects are authorized for a variety of purposes, the most common of which are flood control, navigation, hydroelectric power generation, water supply, fish and wildlife conservation and enhancement, recreation, and low-flow augmentation.

c. Trophic Status

Reservoirs are commonly classified or grouped by trophic or nutrient status. The natural progression of water bodies through time is from an oligotrophic (i.e., low nutrient/low productivity) through a mesotrophic (i.e., intermediate nutrient/intermediate productivity) to a eutrophic (i.e., high nutrient/high productivity) condition. The prefixes "ultra" and "hyper" are sometimes added to oligotrophic and eutrophic, respectively, as additional degrees of trophic status. The tendency toward the eutrophic or nutrient-rich status is common to all impounded waters.

The eutrophication or enrichment process has received considerable study because:

(a) It can be accelerated by nutrient additions through cultural activities (e.g., point-source discharges and nonpoint sources such as agriculture, urbanization, etc.).

(b) Water quality conditions associated with eutrophication may not be desired.

(c) To a certain degree, cultural eutrophication impacts are reversible.

The majority of reservoir water quality conditions relate to the eutrophication process. Certain physical, chemical, and biological factors change during eutrophication.

SUMMARY OF THE INVENTION

The present invention seeks to provide methods and systems for controlling water quality of a reservoir, by controlling how much the body of water is at least partially covered with a cover or covers. As described more in detail hereinbelow, the present invention uses a system of sensors in a control loop to regulate the water quality by circulating/mixing water layers of the reservoir that are exposed to the uncovered surface of the reservoir.

There is provided in accordance with an embodiment of the present invention a system for controlling water quality of a reservoir including one or more covers that at least partially cover a reservoir, one or more water quality sensors that sense physical, chemical, and biological water quality characteristics of water in the reservoir, a mixer for circulating/mixing water layers of the reservoir, and a controller in communication with the water quality sensors that processes input from the sensors to circulate/mix water layers of the reservoir that are exposed to an uncovered surface of the reservoir so as to control water quality characteristics of water in the reservoir (e.g., so as to regulate the amount of oxygen) and/or to move the covers over an upper surface of the reservoir so as to expose more or less of the upper surface of the reservoir to control water quality of the reservoir.

The covers may come in rolls which are wound or unwound over the upper surface of the reservoir.

The water quality sensors sense physical, chemical, and biological characteristics of water in the reservoir. For example, the water quality sensors may include at least one of temperature sensors, pressure sensors, flow meters, density sensors, and viscosity sensors. As another example, the water quality sensors may include chemical sensors that sense at least one of oxygen content, carbon dioxide content, pH, presence of different elements, and ion concentration of water in the reservoir. As yet another example, the water quality sensors may include biological sensors for measuring trophic or nutrient status of the reservoir.

The water quality sensors may be positioned at an epilimnion or upper layer of the reservoir, at a metalimnion or transitional layer of the reservoir, or at a hypolimnion or lower layer of the reservoir.

There is also provided in accordance with an embodiment of the present invention a method for controlling water quality of a reservoir including at least partially covering a reservoir with one or more covers, sensing physical, chemical, and biological water quality characteristics of water in the reservoir, and in response to sensed status of the water quality characteristics, circulating/mixing water layers of the reservoir that are exposed to an uncovered surface of the reservoir so as to control water quality characteristics of water in the reservoir, and/or moving the covers over an upper surface of the reservoir so as to expose more or less of the upper surface of the reservoir to control water quality of the reservoir.

BRIEF DESCRIPTION OF THE DRAWINGS

The present invention will be understood and appreciated more fully from the following detailed description taken in conjunction with the drawings in which:

FIG. 1 is a simplified illustration of a system for controlling water quality of a reservoir, constructed and operative in accordance with an embodiment of the present invention.

DETAILED DESCRIPTION OF EMBODIMENTS

Reference is now made to FIG. 1, which illustrates a system 10 for controlling water quality of a reservoir 12, constructed and operative in accordance with a non-limiting embodiment of the present invention.

The system 10 includes one or more covers 14 that at least partially cover the reservoir 12.

Covers 14 may be constructed of a variety of materials and come in a variety of dimensions. For example, covers 14 may be geomembranes, which are liners or membranes that may be used to cover bodies of water. Geomembranes provide low cost, long-term lining and covering solutions and are available from various manufacturers, such as GSI (http://www-.geo-synthetics.com/index.html). One brand from GSI is the Pondgard® EPDM Liner, which is a highly flexible liner with superior strength characteristics. The liner is safe for all fish and plants and is very UV stable. Another example is the blended Medium Density Polyethylene (MDPE) geomembrane which is low cost, long-lasting and has excellent elongation characteristics, which make it readily moldable around unusual shapes. The liner has a high carbon black content which provides extreme resistance to UV degradation. As another example, the geomembrane may be constructed, without limitation, of HYPALON, Dupont's trademark for chlorosulfonated polyethylene (CSPE) synthetic rubber, which has excellent resistance to chemicals, temperature extremes, and ultraviolet light. Another suitable geomembrane flexible floating cover material is manufactured by Comanco Company, 4301 Sterling Commerce Drive, Plant City, Fla. 33566 (www.comanco.com). The geomembrane may be inflatable.

Another example of covers 14 is that of PCT published application WO 2007/141773 to the present inventors/assignees, which describes a solar cell geomembrane assembly including a solar cell integrated with a geomembrane. The solar cell may be disposed on or attached to the geomembrane. The geomembrane includes a flexible floating cover material that floats on a water surface or alternatively partially submerged below a water surface (in which case, water above the geomembrane functions as a magnifying glass to amplify suns rays that impinge upon the solar cell).

Another example of covers 14 is that of PCT published application WO 2008/012791 to the present inventors/assignees, which describes the concept of WIPV (Water Integrated Photovoltaic) Technology/Systems.

WIPV technology/systems/installations protect precious clean water sources from evaporation by using a WIPV floating solar cover made of prefabricated or field-installed geomembrane and solar cells and/or modular interconnected solar cells (flexible or other and modularly connected using interconnecting elements) that float or are buoyant and have direct contact with the water body.

The covers 14 may be spread over reservoir 12 to at least partially cover reservoir 12. For example, the covers 14 may come in rolls (or spools) 16 which are spread over the water surface. The rolls 16 are wound or unwound by means of one or more actuators 18 (such as servomotors) controlled by a controller or processor 20. Controller 20 is in communication with one or more water quality sensors 22 that sense the water quality of reservoir 12.

Water quality sensors 22 may include, without limitation, sensors that sense the physical, chemical, and biological characteristics of water. For example, water quality sensors 22 may include temperature sensors (e.g., thermocouples or thermistors), pressure sensors, flow meters (e.g., that measure water velocity or volumetric flow rates), density sensors, viscosity sensors, chemical sensors (e.g., oxygen content, carbon dioxide content, pH sensors, sensors for detecting the presence of different elements, ion concentration and many more), and biological sensors (e.g., for measuring algae content and type, presence and amount of fish, nutrient content for measuring and/or monitoring the trophic or nutrient status of the reservoir, and many more).

Water quality sensors 22 may be positioned at any point or level in reservoir 12. For example, for a stratified reservoir, the sensors may be placed at the epilimnion or upper layer, at the metalimnion or transitional layer, and at the hypolimnion or lower layer. For a non-stratified reservoir, the sensors may be placed at any level, too.

Controller 20 receives input from the water quality sensors 22 (by wired or wireless connection), and analyzes the sensor inputs. Controller 20 is in operative communication with a mixer 23. The present invention postulates that the water quality of reservoir 12 can be regulated by circulating/mixing water layers of the reservoir that are exposed to the uncovered surface of the reservoir so as to control oxygen content or other water quality characteristics. Additionally or alternatively, the water quality of reservoir 12 can be regulated by controlling how much the upper surface of the reservoir 12 is exposed (i.e., uncovered). Depending on the desired quality of the water, controller 20 commands actuators 18 to wind or unwind rolls 16 to expose more or less of the upper surface of the reservoir 12, respectively. Over time, controller 20 can thus control the progression of reservoir 12 from an oligotrophic through a mesotrophic to a eutrophic condition, or to maintain a certain condition over a period of time.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A method for controlling water quality of a reservoir comprising:
   at least partially covering a reservoir with one or more covers;
   obtaining sensed inputs of at least one of physical, chemical, and biological water quality characteristics of water in the reservoir before and after circulating/mixing water layers of the reservoir;
   analyzing said sensed inputs and if a desired value of said at least one water quality characteristic is not achieved, then performing both of the following steps:
   a) further circulating/mixing water layers of the reservoir,
   b) moving said one or more covers over an upper surface of said reservoir so as to expose more or less of the upper surface of said reservoir; and
   obtaining another sensed input of said at least one water quality characteristic, and if needed, repeating steps (a) and (b) so as to maintain a certain desired condition over a period of time.

2. The method according to claim 1, comprising repeating steps (a) and (b) to cause progression of said reservoir from an oligotrophic condition through a mesotrophic condition to a eutrophic condition.

* * * * *